(12) United States Patent
Boon et al.

(10) Patent No.: US 10,075,724 B2
(45) Date of Patent: Sep. 11, 2018

(54) DYNAMIC IMAGE PREDICTIVE ENCODING AND DECODING DEVICE, METHOD, AND PROGRAM

(71) Applicant: NTT DOCOMO, INC., Tokyo (JP)

(72) Inventors: Choong Seng Boon, Tokyo (JP); Junya Takiue, Tokyo (JP); Akira Fujibayashi, Tokyo (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 359 days.

(21) Appl. No.: 14/583,242

(22) Filed: Dec. 26, 2014

(65) Prior Publication Data

US 2015/0110184 A1   Apr. 23, 2015

Related U.S. Application Data

(63) Continuation of application No. PCT/JP2013/060730, filed on Apr. 9, 2013.

(30) Foreign Application Priority Data

Jun. 28, 2012 (JP) .................. 2012-145832

(51) Int. Cl.
*H04N 19/50* (2014.01)
*H04N 19/172* (2014.01)
(Continued)

(52) U.S. Cl.
CPC .......... *H04N 19/50* (2014.11); *H04N 19/157* (2014.11); *H04N 19/172* (2014.11); *H04N 19/46* (2014.11)

(58) Field of Classification Search
CPC ...... H04N 19/50; H04N 19/157; H04N 19/46; H04N 19/172
See application file for complete search history.

(56) References Cited

U.S. PATENT DOCUMENTS

2008/0260045 A1   10/2008 Rodriguez et al.
2013/0272430 A1*  10/2013 Sullivan ................ H04N 19/70
                                                   375/240.26
(Continued)

FOREIGN PATENT DOCUMENTS

JP         6045222 B2    12/2016

OTHER PUBLICATIONS

Bross, Benjamin, et al., "High efficiency video coding (HEVC) text specification draft 7," dated Jun. 12, 2012, pp. 1-11, Document No. JCTVC-I1003_d4, Joint Collaborative Team on Video Coding (JCT-VC) of ITU-T SG16 WP3 and ISO/IEC JTC1/SC29/WG11, 9th Meeting Geneva, URL: http://phenix.int-evry.fr/jct/doc_end_user/current_document.php?id=5885.

(Continued)

*Primary Examiner* — Christopher S Kelley
*Assistant Examiner* — Nasim Nirjhar
(74) *Attorney, Agent, or Firm* — Brinks Gilson & Lione

(57) ABSTRACT

A video predictive encoding device can include an input device to implement input of pictures constituting a video sequence; an encoder to encode the pictures by intra-prediction or inter-prediction and to encode output order information of each picture and information about a picture type of each picture to generate compressed picture data. The compressed picture data includes a picture to serve as a random access point. The video predictive coding device can also include a reconstruction unit to decode the compressed picture data to reconstruct pictures; a picture storage unit to store one or more of the reconstructed pictures as reference pictures to be used for encoding of a subsequent picture; and a controller to determine the picture type and control the picture storage unit based on the determined picture type. The controller can label each picture as one of following three types: CRA picture, type-1 picture and type-2 picture.

3 Claims, 10 Drawing Sheets

DESCRIPTION OF VARIOUS PICTURES AROUND RANDOM ACCESS PICTURE

DECODING ORDER: FROM LEFT TO RIGHT; Poc: RELATIVE VALUES

PAST PICTURES: PICTURES DECODED BEFORE CRA PICTURE AND PRECEDING CRA PICTURE IN OUTPUT ORDER

LAGGING PICTURE: PICTURE DECODED BEFORE CRA PICTURE BUT FOLLOWING CRA PICTURE IN OUTPUT ORDER

LEADING PICTURES: PICTURES DECODED AFTER CRA PICTURE BUT PRECEDING CRA PICTURE IN OUTPUT ORDER

NORMAL PICTURES: PICTURES DECODED AFTER CRA PICTURE AND FOLLOWING CRA PICTURE IN OUTPUT ORDER

OUTPUT ORDER: FROM LEFT TO RIGHT; Poc: RELATIVE VALUES

(51) Int. Cl.
H04N 19/46 (2014.01)
H04N 19/157 (2014.01)

(56) References Cited

U.S. PATENT DOCUMENTS

2013/0279599 A1* 10/2013 Wang .............. H04N 19/00139
375/240.25
2014/0146885 A1* 5/2014 Park ................ H04N 21/42623
375/240.12
2015/0110184 A1 4/2015 Boon et al.

OTHER PUBLICATIONS

Japanese Office Action with English translation, dated May 17, 2016, pp. 1-7, issued in Japanese Patent Application No. P2012-145832, Japanese Patent Office, Tokyo, Japan.
Office Action in corresponding Malaysian Application No. PI 2014703745, dated Apr. 28, 2017, 3 pages.
Hendry, et al., "Undiscardable Leading Pictures for CRA," dated Nov. 21, 2011, pp. 1-7, No. JCTVC-G158, Joint Collaborative Team on Video Coding (JCT-VC) of ITU-T SG16 WP3 and ISO/IEC JTC1/SC29/WG11, 7th Meeting, Nov. 21-30, 2011, Geneva, Switzerland; XP030050274.
Bross, B., et al., "WD4: Working Draft 4 of High-Efficiency Video Coding," dated Aug. 9, 2011, pp. 1-215, No. JCTVC-F803, Joint Collaborative Team on Video Coding (JCT-VC) of ITU-T SG16 WP3 and ISO/IEC JTC1SC29/WG11, 6th Meeting, Jul. 14-Jul. 22, 2011, Torino, Italy; XP030009800.
Extended European Search Report, dated Jan. 25, 2016, pp. 1-11, issued in European Patent Application No. 13810810.5, European Patent Office, Munich, Germany.
Office Action, and English language translation thereof, in corresponding Japanese Application No. 2016-222434, dated Dec. 12, 2017, 7 pages.
International Preliminary Report on Patentability, dated Jan. 8, 2015, pp. 1-6, issued in International Application No. PCT/JP2013/060730, Japanese Patent Office, Tokyo, Japan.
Written Opinion of the Intellectual Office of Singapore, dated Sep. 29, 2015, pp. 1-13, issued in Singapore Patent Application No. 11201407722U, Intellectual Property Office of Singapore, Singapore.
Wang, Y.K., et al., "On bitstreams starting with CRA pictures," Feb. 1, 2012, pp. 1-6, Joint Collaborative Team on Video Coding (JCT-VC) of ITU-T SG16 WP3 and ISO/IECJTC1/SC29/WG11, 8th Meeting, San Jose, CA USA Feb. 1-10, 2012, Document: JCTVC-H0496r2, Retrieved from the Internet, <URL: http://phenix.int-evry.fr/jct/doc_end_user/current_document.php?id=4805>.
Written Opinion of the Intellectual Property Office of Singapore, dated Apr. 8, 2015, pp. 1-12, issued in Singapore Patent Application No. 11201407722U, Intellectual Property Office of Singapore, Singapore.
Canadian Office Action, dated Mar. 21, 2016, p. 1-6, issued in Canadian Patent Application No. 2,877,916, Canadian Intellectual Property Office, Gatineau, Quebec, Canada.
Bross, B., Han, W.J., Ohm, J.R., Sullivan, G.J., Wiegand, T., "Joint Collaborative Team on Video Coding (JCT-VC) of ITU-T SG16 WP3 and ISO/IEC JTC1/SC29/WG11," pp. 1-280, 9th Meeting, Geneva, Switzerland, Apr. 27-May 7, 2012.
International Search Report with English Translation, dated May 21, 2013, pp. 1-5, issued in International Application No. PCT/JP2013/060730, Japanese Patent Office, Tokyo, Japan.
Office Action, and English language translation thereof, in corresponding Japanese Application No. 2016-222434, dated Apr. 3, 2018, 9 pages.

* cited by examiner

Fig. 10

DESCRIPTION OF VARIOUS PICTURES AROUND RANDOM ACCESS PICTURE

DECODING ORDER: FROM LEFT TO RIGHT; Poc: RELATIVE VALUES

PAST PICTURES: PICTURES DECODED BEFORE CRA PICTURE AND PRECEDING CRA PICTURE IN OUTPUT ORDER

LAGGING PICTURE: PICTURE DECODED BEFORE CRA PICTURE BUT FOLLOWING CRA PICTURE IN OUTPUT ORDER

LEADING PICTURES: PICTURES DECODED AFTER CRA PICTURE BUT PRECEDING CRA PICTURE IN OUTPUT ORDER

NORMAL PICTURES: PICTURES DECODED AFTER CRA PICTURE AND FOLLOWING CRA PICTURE IN OUTPUT ORDER

| P Poc -6 | ... | B Poc -8 | B Poc -7 | CRA Poc 0 | B Poc -3 | B Poc -5 | B Poc -4 | B Poc -2 | B Poc -1 | P Poc -6 | B Poc -3 | B Poc 1 | B Poc 2 | B Poc 4 | B Poc 5 |

OUTPUT ORDER: FROM LEFT TO RIGHT; Poc: RELATIVE VALUES

| ... | B Poc -8 | B Poc -7 | P Poc -6 | B Poc -5 | B Poc -4 | B Poc -3 | B Poc -2 | B Poc -1 | CRA Poc 0 | B Poc 1 | B Poc 2 | B Poc 3 | B Poc 4 | B Poc 5 | P Poc 6 | B Poc 7 |

DYNAMIC IMAGE PREDICTIVE ENCODING AND DECODING DEVICE, METHOD, AND PROGRAM

This application is a continuation of PCT/JP2013/060730, filed Apr. 9, 2013, which claims the benefit of the filing date pursuant to 35 U.S.C. § 119 of JP2012-145832, filed Jun. 28, 2012, both of which are incorporated herein by reference.

TECHNICAL FIELD

The present disclosure relates to a video predictive encoding device, method, and program and a video predictive decoding device, method, and program and, more particularly, to a video predictive encoding device, method, and program and a video predictive decoding device, method, and program associated with inter-prediction effective to random access.

BACKGROUND ART

Compression techniques are used for efficient transmission and storage of video data. The techniques according to MPEG1-4 and H.261-H.264 are widely used for compressing video data.

SUMMARY

As a video predictive decoding device starts decoding from a random access point, there is the possibility of existence of an incorrectly-decoded picture, and the incorrectly-decoded picture should not be used for decoding thereafter. On the other hand, in the case where there is a correctly-decoded picture, the correctly-decoded picture can be used for decoding thereafter. Since conventional technologies have no method for specifying which picture following the random access point in decoding order should be discarded, all leading pictures are handled as pictures that cannot be correctly decoded, and are thus discarded. However, some of these pictures can in fact be decoded, and can contribute to improvement in prediction performance of subsequent pictures; therefore, discarding all of the leading pictures as incorrectly-decoded pictures is not desirable.

A video predictive coding system as described herein can enable identification of a decodable picture so as to make the decodable picture available as a reference picture for a subsequent picture, thereby contributing to improvement in prediction performance.

An example embodiment of the video predictive coding system can include a video predictive encoding device which includes: input means which inputs a plurality of pictures constituting a video sequence; encoding means which encodes the pictures by a method of either intra-prediction or inter-prediction to generate compressed picture data and which also encodes output order information of each picture and information about a picture type of each picture, the compressed picture data generated to include a picture serving as a random access point; reconstruction means which decodes the compressed picture data to reconstruct pictures; picture storage means which stores one or more of the reconstructed pictures as reference pictures to be used for encoding of a subsequent picture; and control means which determines the picture type and controls the picture storage means, based on the determination of the picture type, wherein the control means labels each of the pictures as one of three types defined below: 1) a clean random access (CRA) picture: a picture which is characterized in that a type 2 picture subsequent to a CRA picture can be correctly decoded when decoding is started from the CRA picture; 2) a type 1 picture: a picture which is decoded after a CRA picture associated with the picture, and is output before the associated CRA picture, which is not subjected to a list of reference pictures including at least one reference picture labeled as a type 1 picture or at least one reference picture preceding said associated CRA picture in decoding order, for execution of inter-prediction; 3) a type 2 picture: a picture which has a list of reference pictures, for execution of inter-prediction, and which is characterized in that every reference picture in the list of reference pictures is labeled as either a type 2 picture or a CRA picture and is decoded after a CRA picture associated with the picture.

An embodiment of the video predictive coding system can also use a video predictive encoding method executed by a video predictive encoding device. The method comprising: an input step of inputting a plurality of pictures constituting a video sequence; an encoding step of encoding the pictures by a method of either intra-prediction or inter-prediction to generate compressed picture data including a picture serving as a random access point and also encoding output order information of each picture and information about a picture type of each picture; a reconstruction step of decoding the compressed picture data to reconstruct pictures; a picture storage step of storing one or more of the reconstructed pictures as reference pictures to be used for encoding of a subsequent picture; and a control step of determining the picture type and controlling the picture storage step, based on the determined picture type, wherein the control step further comprises the video predictive encoding device labeling each of the pictures as one of three types defined below: 1) CRA picture: a picture which is characterized in that a type 2 picture, subsequent to a CRA picture, can be correctly decoded when decoding is started from the CRA picture; 2) type 1 picture: a picture which is decoded after a CRA picture associated with the picture and is output before the associated CRA picture, and which has a list of reference pictures for execution of inter-prediction, the list of reference pictures including at least one reference picture labeled as a type 1 picture, or at least one reference picture preceding said associated CRA picture in decoding order; 3) type 2 picture: a picture which has a list of reference pictures, for execution of inter-prediction, and which is characterized in that every reference picture in the list of reference pictures is labeled as a type 2 picture or as a CRA picture and is decoded after an associated CRA picture.

An embodiment of the video predictive coding system can also include a video predictive encoding program that can be used to at least partially enable a video predictive encoding device to function as: input means that inputs a plurality of pictures constituting a video sequence; encoding means which encodes the pictures by a method of either intra-prediction or inter-prediction to generate compressed picture data including a picture serving as a random access point and which also encodes output order information of each picture and information about a picture type of each picture; reconstruction means which decodes the compressed picture data to reconstruct pictures; picture storage means which stores one or more of the reconstructed pictures as reference pictures to be used for encoding of a subsequent picture; and control means which determines the picture type and controls the picture storage means, based on the determination result, wherein the control means labels each of the pictures as one of three types defined below: 1) CRA picture: a picture which is characterized in that a type 2 picture subsequent to a CRA picture can be correctly decoded when decoding is started from the CRA picture; 2) type 1 picture: a picture which is decoded after a CRA picture associated with the picture, and is output before the associated CRA picture, and which has a list of reference pictures for execution of inter-prediction, the list of reference pictures including at least one reference picture labeled as a type 1 picture or at least one reference picture preceding said associated CRA picture in decoding order; 3) type 2 picture: a picture which has a list of reference pictures, for execution of inter-prediction, and which is characterized in that every reference picture in the list of reference pictures is labeled as a type 2 picture or as a CRA picture and decoded after a CRA picture associated with the picture.

An embodiment of the video predictive coding system can also include a video predictive decoding device comprising: input means that inputs, for a plurality of pictures constituting a video sequence, compressed picture data including a random access picture and encoded data indicative of an output order of each picture and a picture type of each picture, resulting from encoding by either intra-prediction or inter-prediction; reconstruction means which decodes the compressed picture data and the encoded data to reconstruct pictures, output order information, and output picture type information; picture storage means which stores one or more of said reconstructed pictures as reference pictures to be used for decoding of a subsequent picture; and control means which controls the reconstruction means, based on the picture type, wherein each picture is labeled with the picture type as one of three types defined below: 1) CRA picture: a picture which is characterized in that a type 2 picture subsequent to a CRA picture, can be correctly decoded when decoding is started from the CRA picture; 2) type 1 picture: a picture which is decoded after an associated CRA picture and is output before the associated CRA picture, and which has a list of reference pictures for execution of inter-prediction, the list of reference pictures including at least one reference picture labeled as a type 1 picture or at least one reference picture preceding said associated CRA picture in decoding order; 3) type 2 picture: a picture which has a list of reference pictures, for execution of inter-prediction, and which is characterized in that every reference picture in the list of reference pictures is labeled as a type 2 picture or as a CRA picture and decoded after an associated CRA picture; and wherein the reconstruction means continues, during a period immediately before a process of a next CRA picture, a decoding process such that when decoding of encoded data is started from a CRA picture, the reconstruction means decodes a picture labeled as a type 2 picture and skips decoding of a picture labeled as a type 1 picture.

An embodiment of the video predictive coding system can also use a video predictive decoding method executed by a video predictive decoding device. The method comprising: an input step of inputting compressed picture data including a random access picture and encoded data indicative of an output order of each picture and a picture type of each picture, resulting from encoding by either inter-prediction or intra-prediction for a plurality of pictures constituting a video sequence; a reconstruction step of decoding the compressed picture data and the encoded data to reconstruct pictures, output order information, and picture type information; a picture storage step of storing one or more of said reconstructed pictures as reference pictures to be used for decoding of a subsequent picture; and a control step of controlling the reconstruction step, based on the picture type, wherein each picture is labeled with the picture type as one of three types defined below: 1) CRA picture: a picture which is characterized in that a type 2 picture subsequent to a CRA picture can be correctly decoded when decoding is started from the CRA picture; 2) type 1 picture: a picture which is decoded after a CRA picture associated with the picture, and is output before the associated CRA picture, and which has a list of reference pictures for execution of inter-prediction, the list of reference pictures including at least one reference picture labeled as a type 1 picture or at least one reference picture preceding said associated CRA picture in decoding order; 3) type 2 picture: a picture which has a list of reference pictures, for execution of inter-prediction, and which is characterized in that every reference picture in the list of reference pictures is labeled as either a type 2 picture or a CRA picture and is decoded after a CRA picture associated with the picture; and wherein in the reconstruction step the video predictive decoding device continues, during a period immediately before a process of a next CRA picture, a decoding process such that when decoding of encoded data is started from a CRA picture, the video predictive decoding device decodes a picture labeled as a type 2 picture and skips decoding of a picture labeled as a type 1 picture.

An embodiment of the video predictive coding system can also include a video predictive decoding program that can be used to at least partially enable a video predictive decoder to function as: input means that inputs compressed picture data including a random access picture and encoded data indicative of an output order of each picture and a picture type of each picture, resulting from encoding by either intra-prediction or inter-prediction for a plurality of pictures constituting a video sequence; reconstruction means which decodes the compressed picture data and the encoded data to reconstruct pictures, output order information, and picture type information; picture storage means which stores one or more of said reconstructed pictures as reference pictures to be used for decoding of a subsequent picture; and control means which controls the reconstruction means, based on the picture type, wherein each picture is labeled with the picture type as one of three types defined below: 1) CRA picture: a picture which is characterized in that a type 2 picture subsequent to a CRA picture can be correctly decoded when decoding is started from the CRA picture; 2) type 1 picture: a picture which is decoded after a CRA picture that is associated with the picture, and is output before the associated CRA picture, and which has a list of reference pictures for execution of inter-prediction, the list of reference pictures including at least one reference picture labeled as a type 1 picture or at least one reference picture preceding said associated CRA picture in decoding order; 3) type 2 picture: a picture which has a list of reference pictures, for execution of inter-prediction, and which is characterized in that every reference picture in the list of reference pictures is labeled as either a type 2 picture or a CRA picture and is decoded after a CRA picture associated with the picture; and wherein the reconstruction means continues, during a period immediately before a process of a next CRA picture, a decoding process such that when decoding of encoded data is started from a CRA picture, the reconstruction means decodes a picture labeled as a type 2 picture and skips decoding of a picture labeled as a type 1 picture.

It should be noted herein that the video predictive encoding device, method, and program and the video predictive decoding device, method, and program according to embodiments of the present disclosure can also be realized employing the modes as described below.

Another embodiment of a video predictive encoding device can include: input means that inputs a plurality of pictures constituting a video sequence; encoding means which encodes the pictures by a method of either intra-prediction or inter-prediction to generate compressed picture data including a picture serving as a random access point, and which also encodes output order information of each picture; reconstruction means which decodes the compressed picture data to reconstruct pictures; picture storage means which stores one or more of the reconstructed pictures as reference pictures to be used for encoding of a subsequent picture; and control means which controls the picture storage means, wherein the control means classifies and controls each of the pictures into three types defined below: 1) a CRA picture from which decoding of encoded data is started; 2) a picture which is decoded after a CRA picture associated with the picture, and is output before the associated CRA picture, which is not subjected to a decoding process by the reconstruction means and is not stored in the picture storage means or output, and which has a list of reference pictures for execution of inter-prediction, the list of reference pictures including at least one reference picture not subjected to the decoding process by the reconstruction means, or at least one reference picture preceding the associated CRA picture in decoding order; 3) a picture which is decoded by the reconstruction means and stored in the picture storage means for reference as needed, and which is characterized in that the picture has a list of reference pictures for execution of inter-prediction and in that every reference picture in the list of reference pictures is decoded by the reconstruction means and is decoded after a CRA picture associated with the picture.

Another embodiment of the video predictive coding system can also use a video predictive encoding method executed by a video predictive encoding device. The method comprising: an input step of inputting a plurality of pictures constituting a video sequence; an encoding step of encoding the pictures by a method of either intra-prediction or inter-prediction to generate compressed picture data including a picture serving as a random access point and also encoding output order information of each picture; a reconstruction step of decoding the compressed picture data to reconstruct pictures; a picture storage step of storing one or more of the reconstructed pictures as reference pictures to be used for encoding of a subsequent picture; and a control step of controlling the picture storage step, wherein in the control step the video predictive encoding device classifies and controls each of the pictures into three types defined below: 1) a CRA picture from which decoding of encoded data is started; 2) a picture which is decoded after a CRA picture associated with the picture, and is output before the associated CRA picture, which is not subjected to a decoding process by the reconstruction step and is not stored in the picture storage step or output, and which has a list of reference pictures for execution of inter-prediction, the list of reference pictures including at least one reference picture not subjected to the decoding process by the reconstruction step, or at least one reference picture preceding the associated CRA picture in decoding order; 3) a picture which is decoded by the reconstruction step and stored in the picture storage step for reference as needed, and which is characterized in that the picture has a list of reference pictures for execution of inter-prediction and in that every reference picture in the list of reference pictures is decoded by the reconstruction step and is decoded after a CRA picture associated with the picture.

Another embodiment of the video predictive coding system can also use a video predictive encoding program that can be used to at least partially enable a video predictive encoder to function as: input means that inputs a plurality of pictures constituting a video sequence; encoding means which encodes the pictures by a method of either intra-prediction or inter-prediction to generate compressed picture data including a picture serving as a random access point and which also encodes output order information of each picture; reconstruction means which decodes the compressed picture data to reconstruct pictures; picture storage means which stores one or more of the reconstructed pictures as reference pictures to be used for encoding of a subsequent picture; and control means which controls the picture storage means, wherein the control means classifies and controls each of the pictures into three types defined below: 1) a CRA picture from which decoding of encoded data is started; 2) a picture which is decoded after a CRA picture associated with the picture, which is output after the associated CRA picture, which is not subjected to a decoding process by the reconstruction means and is not stored in the picture storage means or output, and which has a list of reference pictures for execution of inter-prediction, the list of reference pictures including at least one reference picture that is not subjected to the decoding process by the reconstruction means, or at least one reference picture preceding the associated CRA picture in decoding order; 3) a picture which is decoded by the reconstruction means and stored in the picture storage means for reference as needed, and which is characterized in that the picture has a list of reference pictures for execution of inter-prediction and in that every reference picture in the list of reference pictures is decoded by the reconstruction means and is decoded after a CRA picture associated with the picture.

Another embodiment of the video predictive coding system can include a video predictive decoding device comprising: input means that inputs compressed picture data including a random access picture and encoded data indicative of an output order of each picture, resulting from encoding by either intra-prediction or inter-prediction for a plurality of pictures constituting a video sequence; reconstruction means which decodes the compressed picture data and the encoded data to reconstruct pictures and output order information; picture storage means which stores one or more of said reconstructed pictures as reference pictures to be used for decoding of a subsequent picture; and control means which controls the reconstruction means, wherein the control means classifies and controls each of the pictures into three types defined below: 1) a CRA picture from which decoding of encoded data is started; 2) a picture which is decoded after a CRA picture associated with the picture, and is output before the associated CRA picture, which is not subjected to a decoding process by the reconstruction means and is not stored in the picture storage means or output, and which has a list of reference pictures for execution of inter-prediction, the list of reference pictures including at least one reference picture which is not subjected to the decoding process by the reconstruction means, or at least one reference picture preceding the associated CRA picture in decoding order; 3) a picture which is decoded by the reconstruction means and stored in the picture storage means for reference as needed, and which is characterized in that the picture has a list of reference pictures for execution of inter-prediction and in that every reference picture in the list of reference pictures is decoded by the reconstruction means and decoded after a CRA picture associated with the picture; and wherein the reconstruction means continues, during a period immediately before a process of a next CRA picture, a decoding process such that when decoding of encoded data is started from a CRA picture associated with the picture, the reconstruction means determines whether every reference picture in a list of reference pictures for a target picture is stored in the picture storage means, that if every reference picture in the list of reference pictures is stored, the reconstruction means decodes the target picture, and that if one or more reference pictures in the list of reference pictures are not stored, the reconstruction means skips decoding of the target picture.

Another embodiment of the video predictive coding system can also use a video predictive decoding method executed by a video predictive decoding device. The method comprising: an input step of inputting compressed picture data including a random access picture and encoded data indicative of an output order of each picture, resulting from encoding by either intra-prediction or inter-prediction for a plurality of pictures constituting a video sequence; a reconstruction step of decoding the compressed picture data and the encoded data to reconstruct pictures and output order information; a picture storage step of storing one or more of said reconstructed pictures as reference pictures to be used for decoding of a subsequent picture; and a control step of controlling the reconstruction step, wherein in the control step the video predictive decoding device classifies and controls each of the pictures into three types defined below: 1) a CRA picture from which decoding of encoded data is started; 2) a picture which is decoded after a CRA picture associated with the picture, and is output before the associated CRA picture, which is not subjected to a decoding process by the reconstruction step and is not stored in the picture storage step or output, and which has a list of reference pictures for execution of inter-prediction, the list of reference pictures including at least one reference picture which is not subjected to the decoding process by the reconstruction step, or at least one reference picture preceding the associated CRA picture in decoding order; 3) a picture which is decoded by the reconstruction step and is stored in the picture storage step for reference as needed, and which is characterized in that the picture has a list of reference pictures for execution of inter-prediction and in that every reference picture in the list of reference pictures is decoded by the reconstruction step and is decoded after a CRA picture associated with the picture; wherein in the reconstruction step the video predictive decoding device continues, during a period immediately before a process of a next CRA picture, a decoding process such that when decoding of encoded data is started from an associated CRA picture, the video predictive decoding device determines whether every reference picture in a list of reference pictures for a target picture is stored in the picture storage step, that if every reference picture in the list of reference pictures is stored, the video predictive decoding device decodes the target picture, and that if one or more reference pictures in the list of reference pictures are not stored, the video predictive decoding device skips decoding of the target picture.

Another embodiment of the video predictive coding system can also use a video predictive decoding program that can be used to at least partially enable a video predictive decoder to function as: input means that inputs compressed picture data including a random access picture and encoded data indicative of an output order of each picture, resulting from encoding by either intra-prediction or inter-prediction for a plurality of pictures constituting a video sequence; reconstruction means which decodes the compressed picture data and the encoded data to reconstruct pictures and output order information; picture storage means which stores one or more of said reconstructed pictures as reference pictures to be used for decoding of a subsequent picture; and control means which controls the reconstruction means, wherein the control means classifies and controls each of the pictures into three types defined below: 1) a CRA picture from which decoding of encoded data is started; 2) a picture which is decoded after a CRA picture associated with the picture, and which is output after the associated CRA picture, which is not subjected to a decoding process by the reconstruction means and which is not stored in the picture storage means or output, and which has a list of reference pictures for execution of inter-prediction, the list of reference pictures including at least one reference picture which is not subjected to the decoding process by the reconstruction means, or at least one reference picture preceding the associated CRA picture in decoding order; 3) a picture which is decoded by the reconstruction means and stored in the picture storage means for reference as needed, and which is characterized in that the picture has a list of reference pictures for execution of inter-prediction and in that every reference picture in the list of reference pictures is decoded by the reconstruction means and decoded after a CRA picture associated with the picture; and wherein the reconstruction means continues, during a period immediately before a process of a next CRA picture, a decoding process such that when decoding of encoded data is started from a CRA picture associated with the picture, the reconstruction means determines whether every reference picture in a list of reference pictures for a target picture is stored in the picture storage means, that if every reference picture in the list of reference pictures is stored, the reconstruction means decodes the target picture, and that if one or more reference pictures in the list of reference pictures are not stored, the reconstruction means skips decoding of the target picture.

Embodiments of the video predictive coding system enable discrimination of a decodable picture so as to make the decodable picture available as a reference picture for a subsequent picture, thereby contributing to improvement in prediction performance. More specifically, when decoding is started from a CRA picture at a leading end of a bit stream, the video predictive decoding device can detect whether a certain picture can be correctly decoded (by use of a label or by comparison with a reference picture set). For this reason, the video predictive decoding device can select and discard only a non-decodable picture (instead of discarding all leading pictures), so as to make a decodable picture available as a reference picture for a subsequent picture, thereby contributing to improvement in prediction performance. Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

FIG. 10 is a block diagram illustrating example picture types of pictures around random access pictures.

DESCRIPTION OF EMBODIMENTS

Figure 1:
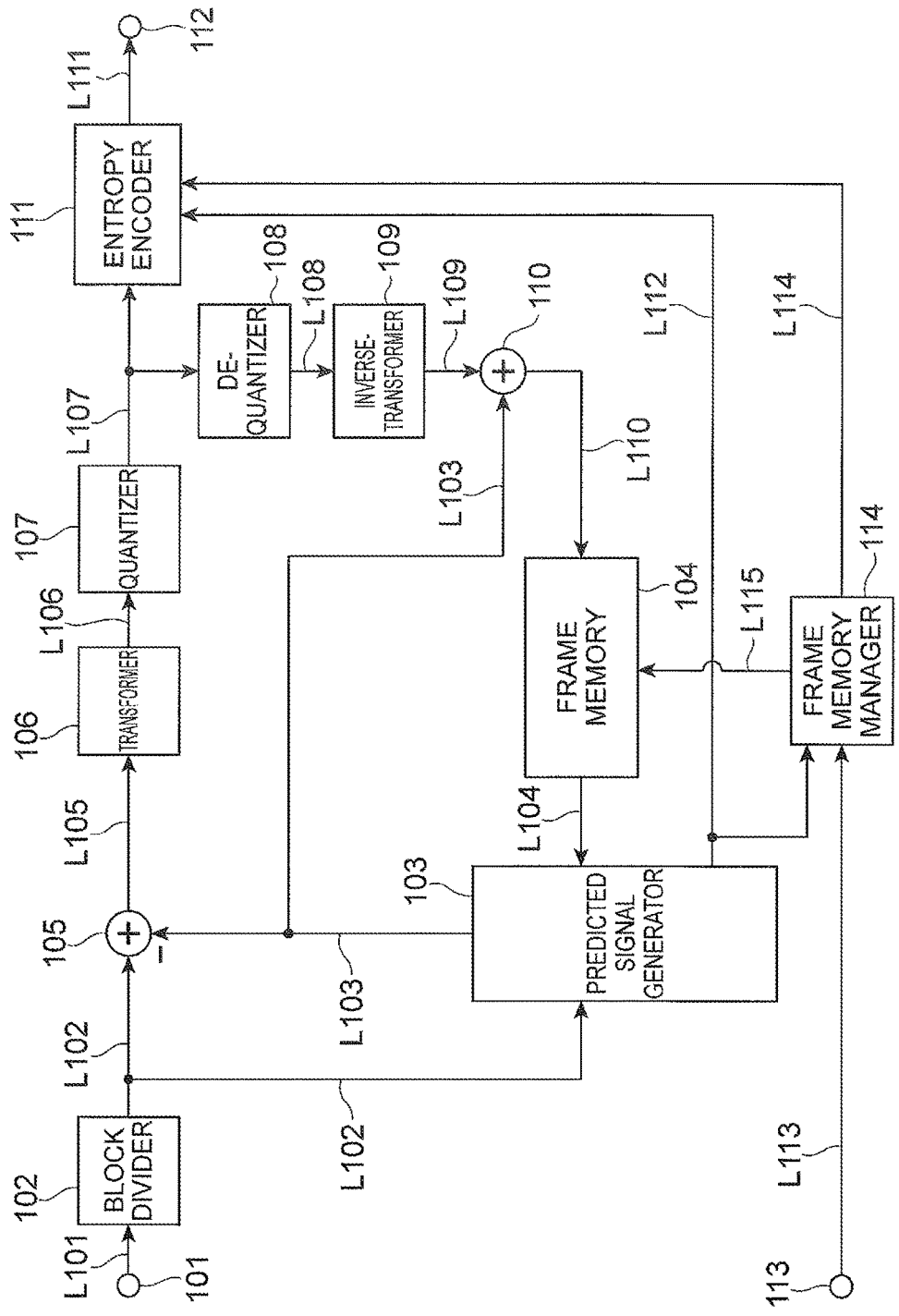
FIG. 1 is a block diagram showing an example of a video predictive encoding device according to an embodiment.

Embodiments of the video predictive coding system will be described below with reference to FIGS. 1 to 9 and 10.

Using compression techniques, a target picture to be encoded can be partitioned into a plurality of blocks which are then subjected to encoding and decoding. Predictive encoding methods can be used for enhancement of encoding efficiency. In intra-predictive encoding, a predicted signal is generated using a decoded neighboring picture signal (a decoded signal from picture data compressed in the past) present in the same frame as a target block, and then a difference signal obtained by subtracting the predicted signal from a signal of the target block is encoded. In inter-predictive encoding, a displacement of signal is searched for with reference to a reconstructed picture signal present in a frame different from a target block, a predicted signal is generated with compensation for the displacement, and a difference signal obtained by subtracting the predicted signal from the signal of the target block is encoded. The reconstructed picture used for reference for the motion search and compensation can be referred to as a reference picture.

In bidirectional inter-prediction, reference can be made not only to past pictures in the output time order, but also to future pictures following the target picture in the output time order (future pictures can be encoded prior to the target picture and preliminarily reconstructed). A predicted signal derived from a past picture and a predicted signal derived from a future picture can be averaged, to provide for effective prediction of a newly-appearing object in a picture, and to reduce noise included in the two predicted signals.

Furthermore, in inter-predictive encoding, such as in H.264, the predicted signal for the target block can be selected by performing the motion search with reference to a plurality of reference pictures which have previously been encoded and then reconstructed, and by defining a picture signal with the smallest error as an optimum predicted signal. A difference can be calculated between the pixel signal of the target block and this optimum predicted signal, which can then be subjected to a discrete cosine transform, quantization, and entropy encoding. At the same time, information regarding a reference picture and a region from which the optimum predicted signal for the target block is derived (which will be respectively referred to as "reference index" and "motion vector") can also be encoded. In H.264, for example, four or five reproduced pictures are stored as reference pictures in a frame memory or decoded picture buffer.

The inter-predictive encoding allows efficient compression encoding by taking advantage of correlation between pictures, while dependence between frames can be avoided in order to allow viewing of a video program from the middle, such as when switching between TV channels. Points having no dependence between frames in a compressed bit stream of a video sequence can be referred to as "random access points." Besides the switching of channels, the random access points can also be used in cases of editing a video sequence and joining compressed data of different video sequences. The "clean random access points" can be provided as random access points. The clean random access points can be specified by clean random access pictures (which will be referred to as hereinafter as "CRA pictures") of Network Abstraction Layer (NAL) unit type. One bit stream can include a plurality of CRA pictures and a video predictive decoding device may start decoding from any clean random access point.

In the described embodiments, picture types of pictures associated with a CRA picture can be defined as follows (see FIG. 10).

a) Past picture: picture decoded before the CRA picture and preceding the CRA picture in output order.
b) Lagging picture: picture decoded before the CRA picture but following the CRA picture in output order.
c) Leading picture: picture decoded after the CRA picture but preceding the CRA picture in output order.
d) Normal picture: picture decoded after the CRA picture and following the CRA picture in output order.

Since the CRA picture can be defined as a picture limited only to intra-prediction, it is provided with all information necessary for decoding and can be correctly decoded without reference to any other picture. Every normal picture following the CRA picture can be defined so that inter-prediction from a past picture, a lagging picture, or a leading picture is prohibited.

Decoding of a bit stream from a CRA picture and normal pictures can be correctly decoded without errors in inter-prediction. However, leading pictures which are decoded after the CRA picture may, or may not be correctly decoded without errors in inter-prediction. In other words, there can be correctly-decoded leading pictures, while there can also be incorrectly-decoded leading pictures.

The term "correctly-decoded" herein means that a decoded picture is substantially the same as a picture obtained in an operation of decoding a bit stream not from the CRA picture, but instead from the head of the bit stream. In decoding from a CRA picture, a picture (e.g., a lagging picture) preceding the CRA picture in decoding order may not be decoded, and therefore may not exist in the decoded picture buffer. Therefore, a subsequent picture, the inter-prediction of which is carried out directly or indirectly using a picture preceding the CRA picture in decoding order, can include a decoding error.

[Video Predictive Encoding Device]

FIG. 1 is a function block diagram showing an example configuration of a video predictive encoding device 100 according to an embodiment of the video predictive coding system. As shown in FIG. 1, the video predictive encoding device 100 is provided with an input terminal 101, a block divider 102, a predicted signal generator 103, a frame memory 104, a subtracter 105, a transformer 106, a quantizer 107, a de-quantizer 108, an inverse-transformer 109, an adder 110, an entropy encoder 111, an output terminal 112, an input terminal 113, and a frame memory manager (or buffer manager) 114 as a functional configuration. The operations of the respective function blocks will be described in the operation of the video predictive encoding device 100 below. The transformer 106 and quantizer 107 correspond to an encoding module and the de-quantizer 108, inverse-transformer 109, and adder 110 correspond to a decoding module. As used herein, the term "module" describes hardware that may also execute software to perform the described functionality. The video predictive encoding device 100 may be a computing device or computer, including circuitry in the form of hardware, or a combination of hardware and software, capable of performing the described functionality. The video predictive encoding device 100 may be one or more separate systems or devices included in the video predictive coding system, or may be combined with other systems or devices within the video predictive coding system. In other examples, fewer or additional modules may be used to illustrate the functionality of the predictive video encoding device.

An example of the operation of the video predictive encoding device 100 configured as described above will be described below. A video signal consisting of a plurality of pictures is fed to the input terminal 101. A picture of an encoding target is partitioned into a plurality of regions by the block divider 102. In the present embodiment, the target picture is partitioned into blocks each consisting of 8×8 pixels, but it may be partitioned into blocks of any size or shape other than the foregoing. A predicted signal is then generated for a region as a target of an encoding process (which will be referred to hereinafter as a target block). The present embodiment employs two types of prediction methods. Namely, the two types of prediction methods are the inter-prediction and the intra-prediction.

In the inter-prediction, reconstructed pictures which have been encoded and thereafter previously reconstructed are used as reference pictures, and motion information to provide the predicted signal with the smallest error from the target block is determined from the reference pictures. This process can be referred to as motion estimation. Depending upon the situation, the target block can also be sub-divided into sub-regions to determine an inter-inter-prediction method for each of the sub-regions. In this case, the most efficient division method for the entire target block and motion information of each sub-region are determined out of various division methods. In an embodiment, the operation is carried out in the predicted signal generator 103, the target block is fed via line L102, and the reference pictures are fed via L104. The reference pictures to be used herein are a plurality of pictures which have been encoded and reconstructed in the past. The details of use of the reference pictures can be, for example, the same as in the methods of MPEG-2 or 4 and H.264 which are the conventional technologies. Once the motion information and sub-region division method are determined as previously described, the motion information and sub-region division method are fed via line L112 to the entropy encoder 111 to be encoded thereby, and then the encoded data is output from the output terminal 112. Information indicating from which reference picture out of the plurality of reference pictures the predicted signal is derived (such information is called a "reference index") is also sent via line L112 to the entropy encoder 111. In an embodiment, four or five reconstructed pictures are stored in the frame memory 104 to be used as reference pictures. The predicted signal generator 103 derives reference picture signals from the frame memory 104, based on the reference pictures and motion information, corresponding to the sub-region division method and each sub-region, and generates the predicted signal. The inter-predicted signal generated in this manner is fed via line L103 to the subtracter 105.

In the intra-prediction, an intra-predicted signal is generated using reconstructed pixel values spatially adjacent to the target block. Specifically, the predicted signal generator 103 derives reconstructed pixel signals in the same frame from the frame memory 104 and extrapolates these signals to generate the intra-predicted signal. The information indicating the method of extrapolation is fed via line L112 to the entropy encoder 111 to be encoded thereby and then the encoded data is output from the output terminal 112. The intra-predicted signal generated in this manner is fed to the subtracter 105. The method of generating the intra-predicted signal in the predicted signal generator 103 can be similar to the method of H.264 being the conventional technology. The predicted signal with the smallest error is selected from the inter-predicted signal and the intra-predicted signal obtained as described above, and the selected predicted signal is fed to the subtracter 105.

Since there are no pictures prior to the first picture, all target blocks thereof are processed by intra-prediction. For switching of TV channels, target blocks regularly defined as random access points are processed by intra-prediction. These pictures are called intra frames and are also called IDR pictures in H.264.

The subtracter 105 subtracts the predicted signal (fed via line L103) from the signal of the target block (fed via line L102) to generate a residual signal. This residual signal is transformed by a discrete cosine transform by the transformer 106 to obtain transform coefficients, which are quantized by the quantizer 107. Finally, the entropy encoder 111 encodes the quantized transform coefficients and the encoded data is output along with the information about the prediction method from the output terminal 112.

For the intra-prediction or the inter-prediction of the subsequent target block, the signal of the target block, which is compressed is subjected to inverse processing to be reconstructed. Namely, the quantized transform coefficients are inversely quantized by the de-quantizer 108 and then transformed by an inverse discrete cosine transform by the inverse-transformer 109, to reconstruct a residual signal. The adder 110 adds the reconstructed residual signal to the predicted signal fed via line L103 to reconstruct a signal of the target block and the reconstructed signal is stored in the frame memory 104. The present embodiment employs the transformer 106 and the inverse-transformer 109, but it is also possible to use other transform processing instead of these transformers. Depending upon situations, the transformer 106 and the inverse-transformer 109 may be omitted.

The frame memory 104 is a finite storage and may not store all reconstructed pictures. Only reconstructed pictures to be used in encoding of the subsequent picture are stored in the frame memory 104. A unit to control this frame memory 104 is the frame memory manager 114. The frame memory manager 114 controls the frame memory 104 via line L115 so as to delete an unnecessary picture (e.g., the oldest picture) out of N reconstructed pictures in the frame memory 104 (where N is 4 in an embodiment, but N may be any predetermined integer) and thereby allow the latest reconstructed picture as a reference picture to be stored. The frame memory manager 114 also receives output order information of each picture and a type of encoding of each picture (intra-predictive encoding, inter-predictive encoding, or bidirectional predictive encoding) from the input terminal 113, and the reference index via line L112, and the frame memory manager 114 operates based on these pieces of information.

At the same time, the output order information of each picture and information of an NAL unit type described below are fed via line L114 to the entropy encoder 111 according to need, in order to be encoded thereby, and the encoded data is output along with the compressed picture data. The output order information is attendant on each picture and may be information indicative of an order of the picture or a time of output of the picture, or an output reference time (temporal reference) of the picture. In the present embodiment, the value of the output order information is directly converted into a binary code. The operation of the frame memory manager 114 in the present embodiment will be described later.

[Video Predictive Decoding Device]

Figure 2:
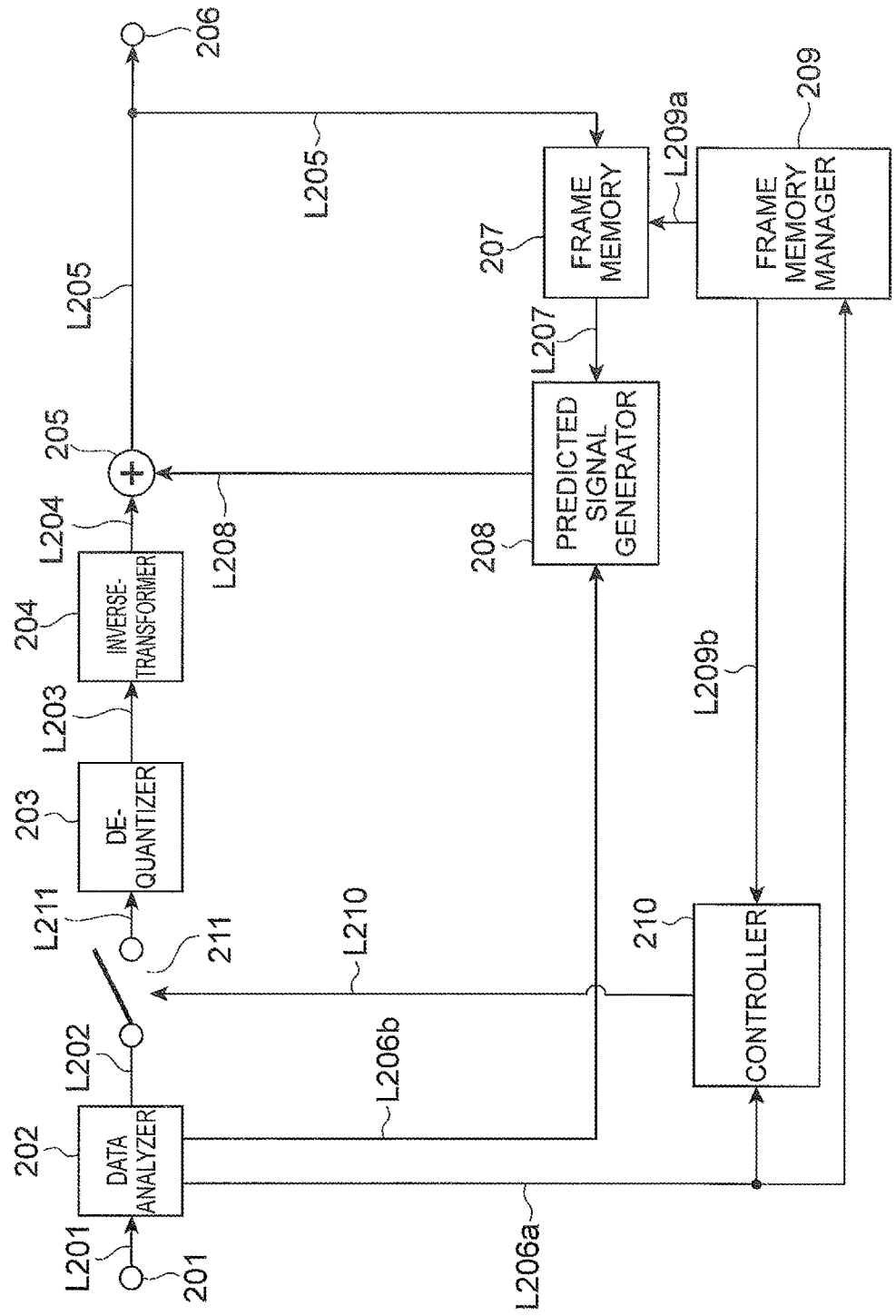
FIG. 2 is a block diagram showing an example of a video predictive decoding device according to an embodiment.

Next, a video predictive decoding device will be described. FIG. 2 is a function block diagram showing a configuration of an example of a video predictive decoding device 200 according to an embodiment of the video predictive coding system. As shown in FIG. 2, the video predictive decoding device 200 is provided with an input terminal 201, a data analyzer 202, a de-quantizer 203, an inverse-transformer 204, an adder 205, a predicted signal generator 208, a frame memory 207, an output terminal 206, a frame memory manager 209, a controller 210, and a switch 211 as a functional configuration. The operations of the respective function blocks will be described in the operation of the video predictive decoding device 200 below. The de-quantizer 203 and the inverse-transformer 204 correspond to a decoding module. The modules associated with decoding is not limited solely to the de-quantizer 203 and the inverse-transformer 204, but may be any other means. Furthermore, the modules associated with decoding may be configured with the de-quantizer 203 only, excluding the inverse-transformer 204. The video predictive decoding device 200 may be a computing device or computer, including circuitry in the form of hardware, or a combination of hardware and software, capable of performing the described functionality. The video predictive decoding device 100 may be one or more separate systems or devices included in the video predictive coding system, or may be combined with other systems or devices within the video predictive coding system. In other examples, fewer or additional modules may be used to illustrate the functionality of the predictive video decoding device.

The operation of the video predictive decoding device 200 will be described below. Compressed data resulting from compression encoding by the aforementioned method by the video predictive encoding device 100 is input through the input terminal 201. This compressed data contains the residual signal resulting from predictive encoding of each target block obtained by division of a picture into a plurality of blocks, and the information related to the generation of the predicted signal. The information related to the generation of the predicted signal includes the information about block division (size of block), the motion information, the aforementioned reference index, and the information about NAL unit type in the case of the inter-prediction, or the information about the extrapolation method from reconstructed surrounding pixels in the case of the intra-prediction.

The data analyzer 202 extracts the residual signal of the target block, the information related to the generation of the predicted signal, the quantization parameter, and the output order information of the picture from the compressed data. The residual signal of the target block is inversely quantized on the basis of the quantization parameter (fed via lines L202 and L211) by the de-quantizer 203. The result is transformed by an inverse discrete cosine transform by the inverse-transformer 204.

Next, the information related to the generation of the predicted signal is fed via line L206b to the predicted signal generator 208. The predicted signal generator 208 accesses the frame memory 207, based on the information related to the generation of the predicted signal, to derive a reference signal from a plurality of reference pictures (via line L207) and generate a predicted signal. The predicted signal is fed via line L208 to the adder 205, the adder 205 adds this predicted signal to the reconstructed residual signal to reconstruct a target block signal, and the target block signal is output via line L205 from the output terminal 206 and also stored in the frame memory 207.

Reconstructed pictures to be used for decoding and reproduction of the subsequent picture are stored in the frame memory 207. The frame memory manager 209 controls the frame memory 207 via line L209a. The frame memory 207 is controlled so that an unnecessary picture (e.g., the oldest picture) is deleted out of N reconstructed pictures stored (where N is 4 in an embodiment, but N may be any predetermined integer) to allow the latest reconstructed picture as a reference picture to be stored.

The controller 210 operates based on the output order information of the target picture and the information about the encoding type and the NAL unit type of the picture, which are fed to the controller 210 via line L206a. In another situation, the controller 210 can operate based on the reference index fed via line L206a and the information of the frames fed via line L209b and stored in the frame memory. The operation of the controller 210 will be described later.

The switch 211 is controlled via line L210 by the controller 210 and operates so as to skip decoding of specific frames depending upon conditions. The operation of the switch 211 will be described later.

Figure 3:
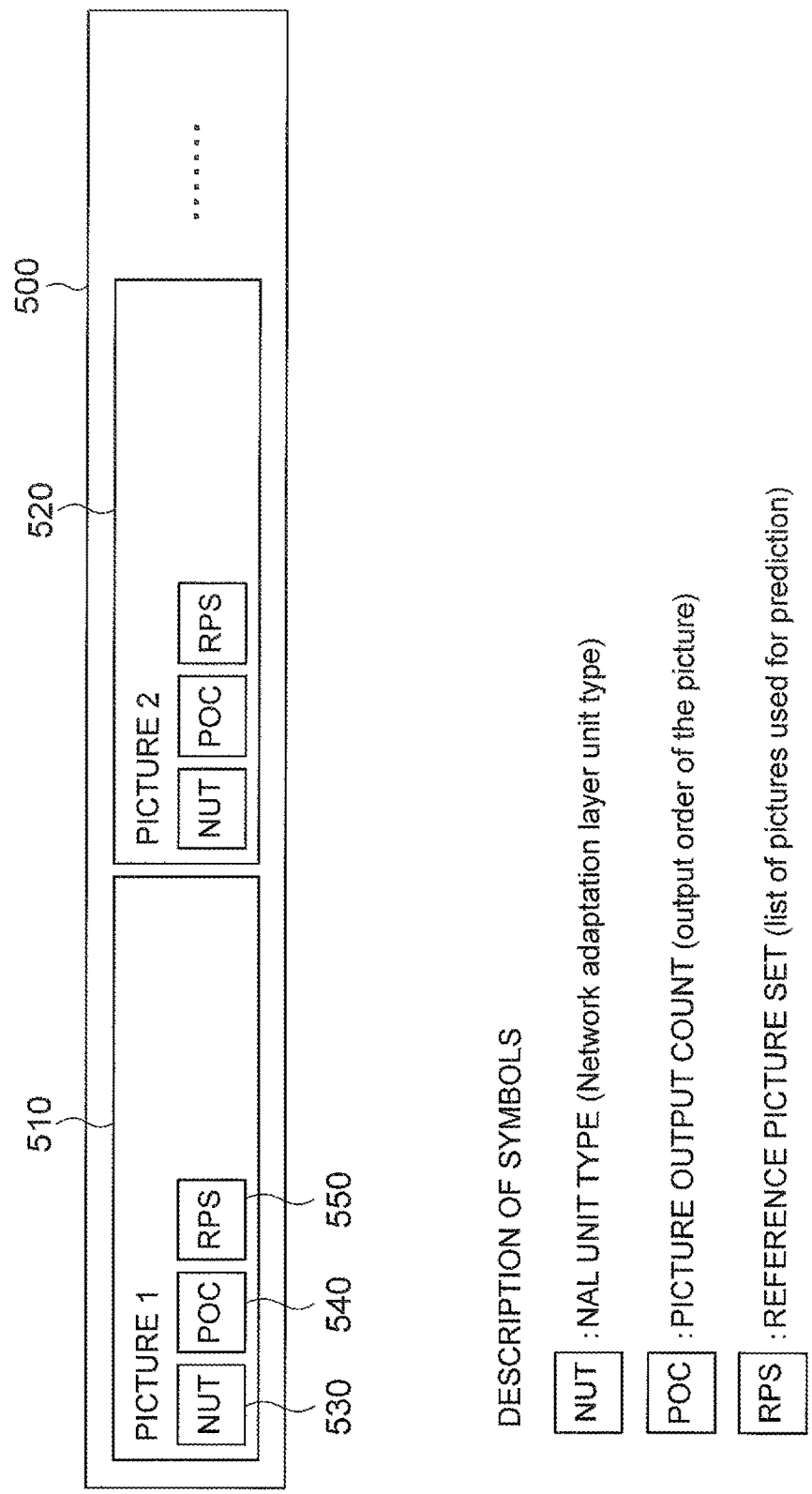
FIG. 3 is a drawing for explaining an example of syntax elements according to an embodiment.

FIG. 3 shows an example of syntax elements 500 of a bit stream. The syntax elements 500 of the bit stream consist of a plurality of syntax elements necessary for decoding of each picture (510, 520, etc.). In a syntax of a picture, attention is focused on three elements below.

1) Network adaptation layer unit type (NUT) or NAL unit type (530)
2) Picture output count (POC) (540)
3) Reference picture set (RPS) (550)

1) NUT includes information about a picture type. It should be noted that other means for signaling a picture type can be employed in other embodiments. In the present embodiment, each picture is labeled as one of three kinds of NAL unit types. The NAL unit types are RAS, CRA, and non-RAS as further described below.

A picture labeled as a RAS (random access skip) picture is skipped so as not to be output, when decoding is started from a CRA picture associated with the RAS picture. On the other hand, when the foregoing CRA picture is not the first picture of a bit stream (or when decoding is not started from the foregoing CRA picture), the video predictive decoding device 200 regards the RAS picture as a non-RAS picture and is configured to decode and output RAS picture in accordance with an output command of the picture.

A picture labeled as a CRA (clean random access) picture indicates that when decoding of a bit stream is started from the CRA picture associated with the CRA picture, any picture except for the RAS picture, can be decoded without error.

A picture labeled as a non-RAS picture is assumed to be decoded by the video predictive decoding device 200 and output in accordance with a picture output command. Each CRA picture is assumed to be a non-RAS picture unless otherwise stated.

2) POC includes information of an order of an output picture.

3) RPS includes information of reference pictures used for inter-prediction of a current picture. Any reference picture in the decoded picture buffer (DPB) not existing in RPS cannot be used as a reference picture for predictive decoding by a current picture, or by any picture.

The present embodiment has the following features about RPS, in order to ensure that when decoding of a bit stream is started from a CRA picture, every non-RAS picture is correctly decoded.

Feature 1: concerning an RPS used by a leading picture, when one or more reference pictures (or at least one reference picture) are RAS pictures or when they are output after a CRA picture associated with the picture, the leading picture shall be deemed a RAS picture.

Feature 2: every reference picture in an RPS used by a non-RAS picture shall be deemed as a reference picture of a non-RAS picture and a reference picture decoded after a CRA picture associated with the picture.

Since in the present embodiment each normal picture is handled as a non-RAS picture, any picture not satisfying Features 1 and 2 is not allowed in a bit stream. However, the predictive video coding system is not limited only to the leading picture described in Feature 1, but can be equally applied to every picture. Concerning Feature 2, the predictive video coding system can also be applied to a situation where the reference pictures are limited to leading pictures only.

[Example Operation in Video Predictive Encoding Device 100]

An example of the operation of the video predictive encoding device 100 for generation of a bit stream with the aforementioned features will be described using the example of FIG. 4. The video predictive encoding device 100 puts CRA pictures in a fixed period in the bit stream, for implementation of random access. All pictures following one input CRA picture in encoding order are associated with the input CRA picture and encoded according to the steps below, before the next CRA picture is input or received.

It is determined in step 620 whether one or more of reference pictures in the RPS of the picture (i.e. target picture for encoding) are RAS pictures. When one or more of the reference pictures in the RPS of the target picture are RAS pictures (YES), the flow goes to step 650; if not (NO) the flow goes to step 630.

It is determined in step 630 whether one or more of the reference pictures in the RPS of the target picture are output before a CRA picture associated with the target picture. When one or more of the reference pictures in the RPS of the target picture are output before the CRA picture associated with the target picture in encoding order (YES), the flow goes to step 650; if not (NO) the flow goes to step 640.

In step 650, the POC of the target picture is compared with the POC of the CRA picture associated with the target picture, whereby it is checked whether the target picture is a leading picture. When the POC of the target picture is smaller than the POC of the CRA picture associated with the target picture, the target picture is determined to be a leading picture (YES) and then the flow goes to step 670. Otherwise, the target picture is determined not to be a leading picture (NO); however, the determinations in step 620 and step 630 should be (YES) for only leading pictures, and the determination result that the target picture is not a leading picture (NO) is abnormal; therefore, the flow goes to step 660 to output an error message and then goes to step 680. After the output of the error message in step 660, the processing of FIG. 4 may be terminated as an abnormal end.

In step 670, the target picture is encoded as a RAS picture and information indicating that the target picture is a RAS picture (NAL unit type: RAS) is encoded. Thereafter, the flow goes to step 680.

In step 640, the target picture is encoded as a non-RAS picture and information indicating that the target picture is a non-RAS picture (NAL unit type: non-RAS) is encoded. Thereafter, the flow goes to step 680. It is noted herein that the CRA pictures are included in non-RAS pictures unless otherwise stated.

In steps 640 and 670, the information indicating that the target picture is a RAS picture or a non-RAS picture does not always have to be encoded, but, instead of encoding of the foregoing information, whether the target picture is a RAS picture or a non-RAS picture may be determined by comparison between the reference picture list of each picture and pictures stored in the frame memory 104.

Figure 4:
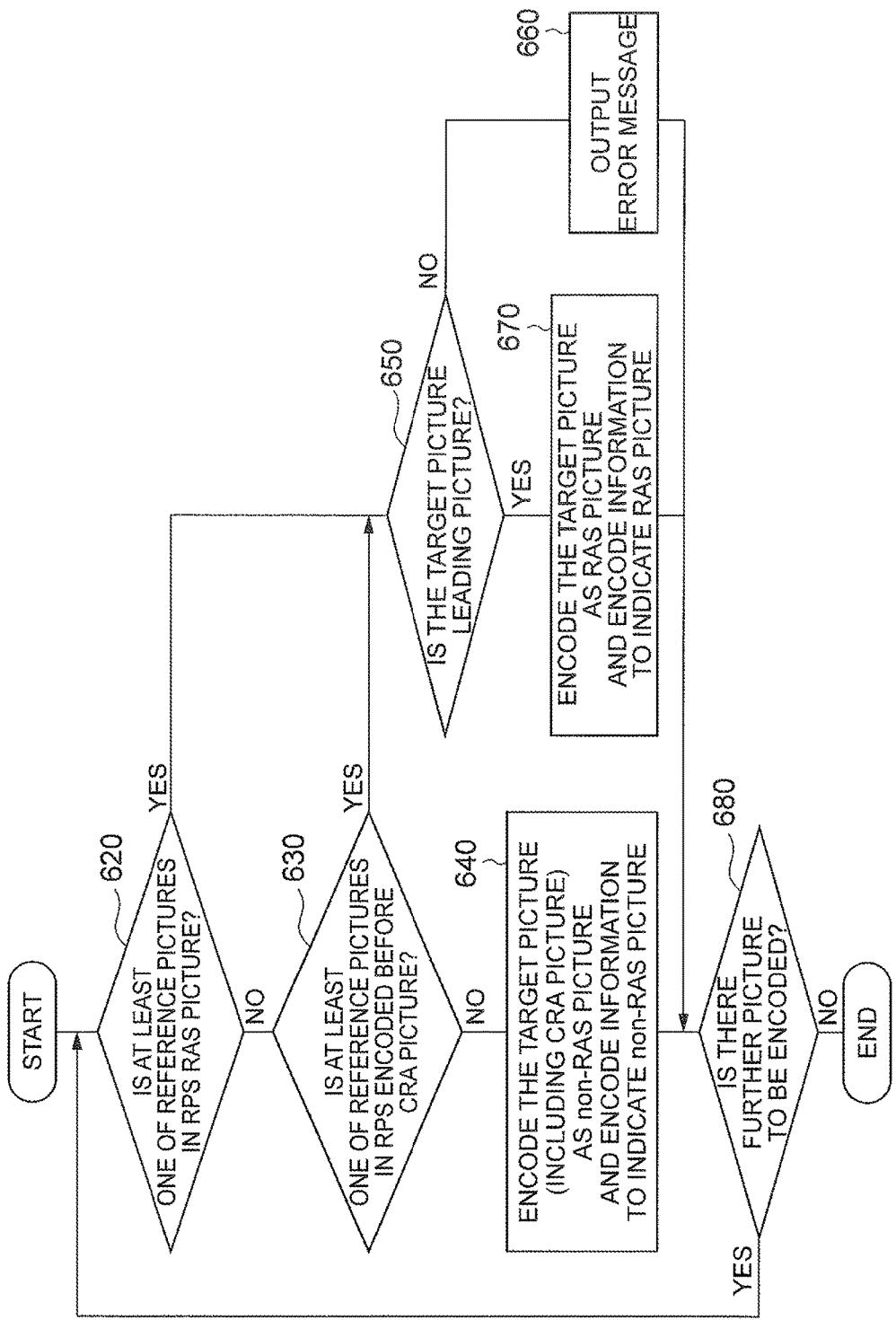
FIG. 4 is a flowchart showing an example of a video predictive encoding method according to an embodiment.

In step 680 the video predictive encoding device 100 determines whether there is a further picture to be encoded; if there is (YES) the flow returns to step 620 to repeat the processing; if not (NO), the processing of FIG. 4 is terminated.

The sequential processing described above corresponds to an example of the processing of the entire video predictive encoding device 100 in FIG. 1, and among others, the determination processes in steps 620, 630, and 650 are performed by the frame memory manager 114.

[Example Operation in Video Predictive Decoding Device 200]

The video predictive decoding device 200 of the present embodiment operates differently when a decoding process is started from a CRA picture as the first picture of a bit stream, from when the first picture of the bit stream is not a CRA picture. This decoding process returns to a normal decoding process upon decoding of the next CRA picture.

Figure 5:
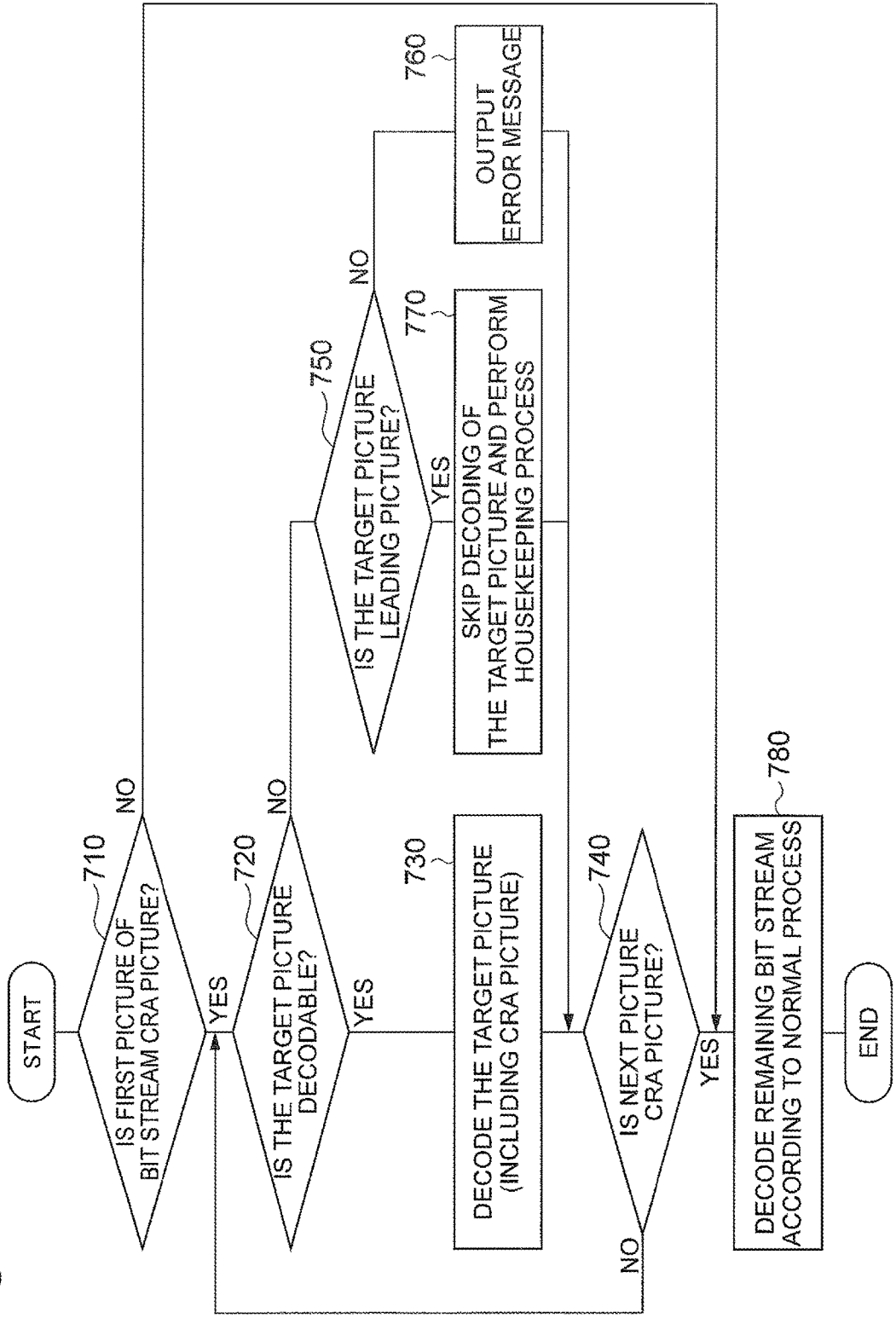
FIG. 5 is a flowchart showing an example of a video predictive decoding method according to an embodiment.

The operation of the video predictive decoding device 200 for decoding of a bit stream with the aforementioned features will be described using the example of FIG. 5.

In step 710, the video predictive decoding device 200 determines, based on the NAL unit type, whether the first picture of the bit stream (i.e., the first picture at a start of decoding of the bit stream) is a CRA picture. When the first picture is not a CRA picture (NO), the flow goes to step 780 where the video predictive decoding device 200 decodes each picture according to the normal operation. Namely, in this step 780 a RAS picture is regarded as a non-RAS picture and is decoded and output according to a command in the picture according to the normal operation. On the other hand, when the first picture of the bit stream is a CRA picture in step 710 (YES), the flow goes to step 720.

The processing from step 720 to step 770 is repeatedly executed for all pictures, during a period immediately before a start of decoding of the next CRA picture, and thereafter, the processing returns to the normal decoding process in step 780. The processing from step 720 to step 770 will be described below.

In step 720, the video predictive decoding device 200 determines whether the picture (i.e. target picture for decoding) is correctly decoded, at a start of decoding of the target picture. Since the bit stream in the present embodiment has Features 1 and 2 described above, the video predictive decoding device 200 can determine whether the target picture can be correctly decoded, using at least one of two methods below. The first method is a method of checking a label of the NAL unit type of the target picture. If the target picture is labeled as a RAS picture, the video predictive decoding device 200 can determine that the target picture cannot be correctly decoded. The second method is a method in which the video predictive decoding device 200 compares the reference pictures in the DPB with the reference picture list of the RPS of the target picture. If any one of the reference pictures in the RPS of the target picture does not exist in the DPB, the video predictive decoding device 200 can determine that the target picture cannot be correctly decoded. When the video predictive decoding device 200 determines that the target picture can be correctly decoded (YES), using at least one of the first and second methods as described above, the flow goes to step 730; when the device determines that the picture cannot be correctly decoded (NO), the flow goes to step 750.

In step 730, the video predictive decoding device 200 decodes and outputs the target picture in accordance with a command in the target picture. This is also applied to the CRA picture. Thereafter, the flow goes to step 740.

In step 750, the device compares the POC of the target picture with the POC of the CRA picture associated with the target picture, thereby determining whether the target picture is a leading picture. When the POC of the target picture is smaller than the POC of the CRA picture associated with the target picture (YES), the target picture is determined to be a leading picture and the flow goes to step 770 described below. Otherwise (NO), the target picture is not a leading picture and can cause an error; therefore, the flow goes to step 760 where the video predictive decoding device 200 outputs an error message and proceeds to step 740. After the output of the error message in step 760, the processing of FIG. 5 may be terminated as an abnormal end. It should be noted as described above that the determination in step 750 is needed only when Feature 1 is limited to leading pictures only.

In step 770, the video predictive decoding device 200 skips decoding of the target picture by not subjecting the target picture to decoding, and performs a housekeeping process as described below. The housekeeping process herein can be, for example, a process of labeling the target picture as skipped, with a label indicating that "the picture is unavailable as a reference frame and thus is not output." Thereafter, the flow goes to step 740.

In step 740, the video predictive decoding device 200 determines whether a picture to be decoded next is a CRA picture, and when the next picture is not a CRA picture (NO), the device returns to step 720 to repeat the processing. On the other hand, when the next picture is a CRA picture (YES), the decoding process (random access decoding process) is no longer necessary after the next CRA picture and therefore the flow goes to step 780 to move into the normal decoding process (process of decoding every picture and outputting it according to output order information).

The sequential processing described above corresponds to the processing of the entire video predictive decoding device 200 in FIG. 2 and, among others, the determinations in steps 720 and 750 and the controls in steps 730 and 770 are carried out by the controller 210.

According to the present embodiment as described above, the video predictive decoding device 200 is able to detect whether a certain picture can be correctly decoded (by use of the label or by comparison with the reference picture set), when decoding is started from the CRA picture at the head of the bit stream. For this reason, the video predictive decoding device 200 can select and discard only a picture that cannot be decoded, instead of discarding all the leading pictures, so as to allow a decodable picture to be used as a reference picture for a subsequent picture, thereby contributing to improvement in prediction performance.

In assigning the NAL unit type of RAS to pictures, the video predictive encoding device 100 generates correctly-decodable pictures and undecodable pictures. On the other hand, the video predictive decoding device 200 does not output the undecodable pictures. This makes temporal gaps in between output pictures, which can affect an output rate of frames. The existence of gaps of output is unfavorable for some systems. In the present embodiment, the video predictive encoding device 100 notifies the video predictive decoding device 200 of whether there are gaps associated with the RAS pictures, as additional information by a flag in the CRA picture header or in a video usability syntax (VUI). The video predictive decoding device 200, receiving this flag, can select whether a leading picture with a gap that can be correctly decoded is to be output.

As another embodiment different from the above, a further restriction may be set on a bit stream so as to avoid a gap at a RAS picture that is output after a CRA picture. Namely, the bit stream may be arranged so as to be continuously output without gaps at RAS pictures.

As still another embodiment, the video predictive decoding device 200 may determine that a leading picture of non-RAS is decoded but not output, independent of the other additional information from the video predictive encoding device 100 or of the output order information of the picture.

In the present embodiment the labels of the NAL unit types (RAS, CRA, and non-RAS) are detected and used by the video predictive decoding device 200, but the labels of NAL unit types may be detected and used for execution of processing to discard the RAS picture, when decoding is started from a random access point, in other devices (e.g., a server, appropriate network elements, and so on) in a network. This can save the network bandwidth.

In the present embodiment, each bit stream can include a large number of CRA pictures and there are RAS pictures associated with respective CRA pictures. When a second CRA picture in decoding order follows a first CRA picture, the RPS of the foregoing second CRA picture should not include any reference picture decoded before the first CRA picture. This ensures that when the first CRA picture is the first picture of the bit stream, the RAS picture of the second CRA picture is decoded.

[Video Predictive Encoding Program and Video Predictive Decoding Program]

The video predictive encoding device 100 can use a video predictive encoding program to at least partially enable at least some functions of the video predictive encoding device 100. Likewise, the video predictive decoding device 200 can use a video predictive decoding program to at least partially enable at least some functions of the video predictive decoding device 200.

The video predictive encoding program and the video predictive decoding program are provided, for example, as stored in a storage medium. Examples of such storage media include flexible disks, CD-ROMs, USB memories, DVDs, semiconductor memories, and so on.

Figure 8:
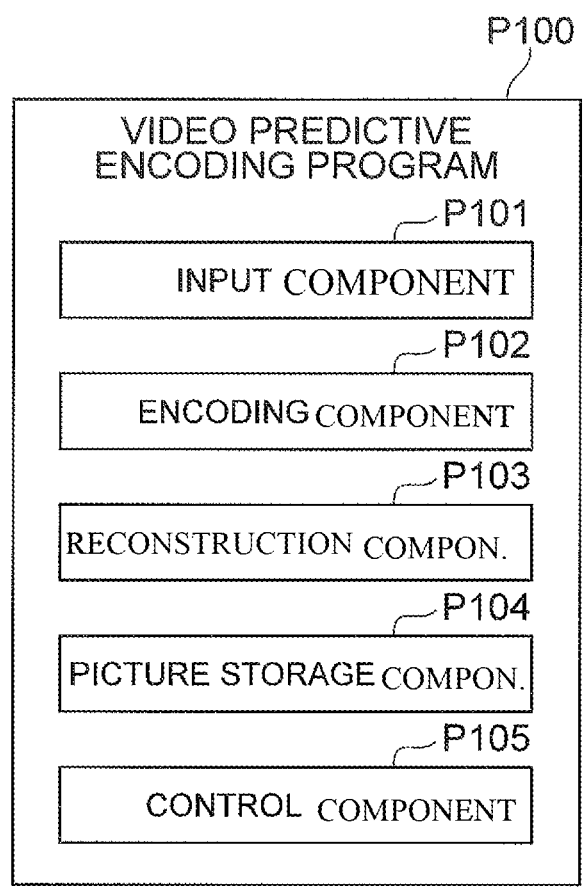
FIG. 8 is a block diagram showing a configuration example of a video predictive encoding program.

FIG. 8 shows an example of components of the video predictive encoding program that can be used with the video predictive encoding device 100. As shown in FIG. 8, the video predictive encoding program P100 is provided with an input component P101, an encoding component P102, a reconstruction component P103, a picture storage component P104, and a control component P105.

Figure 9:
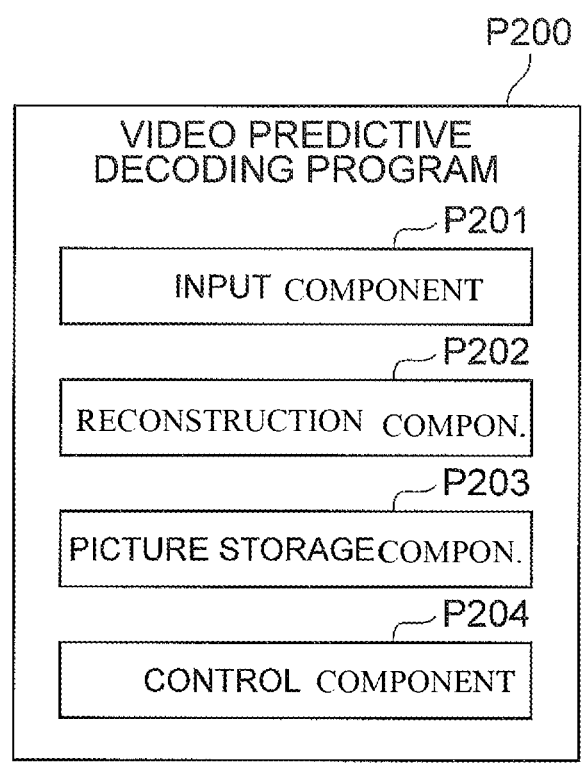
FIG. 9 is a block diagram showing a configuration example of a video predictive decoding program.

FIG. 9 shows an example of components of the video predictive decoding program that can be used with the video predictive decoding device 200. As shown in FIG. 9, the video predictive decoding program P200 is provided with an input component P201, a reconstruction component P202, a picture storage component P203, and a control component P204.

The video predictive encoding program P100 and the video predictive decoding program P200 configured as described above can be stored in a storage medium 10 shown in FIGS. 6 and 7 and can be executed by the video predictive encoding device 100 and the video predictive decoding device 200, which are special purpose devices that are depicted generally as a computer 30 described below.

Figure 6:
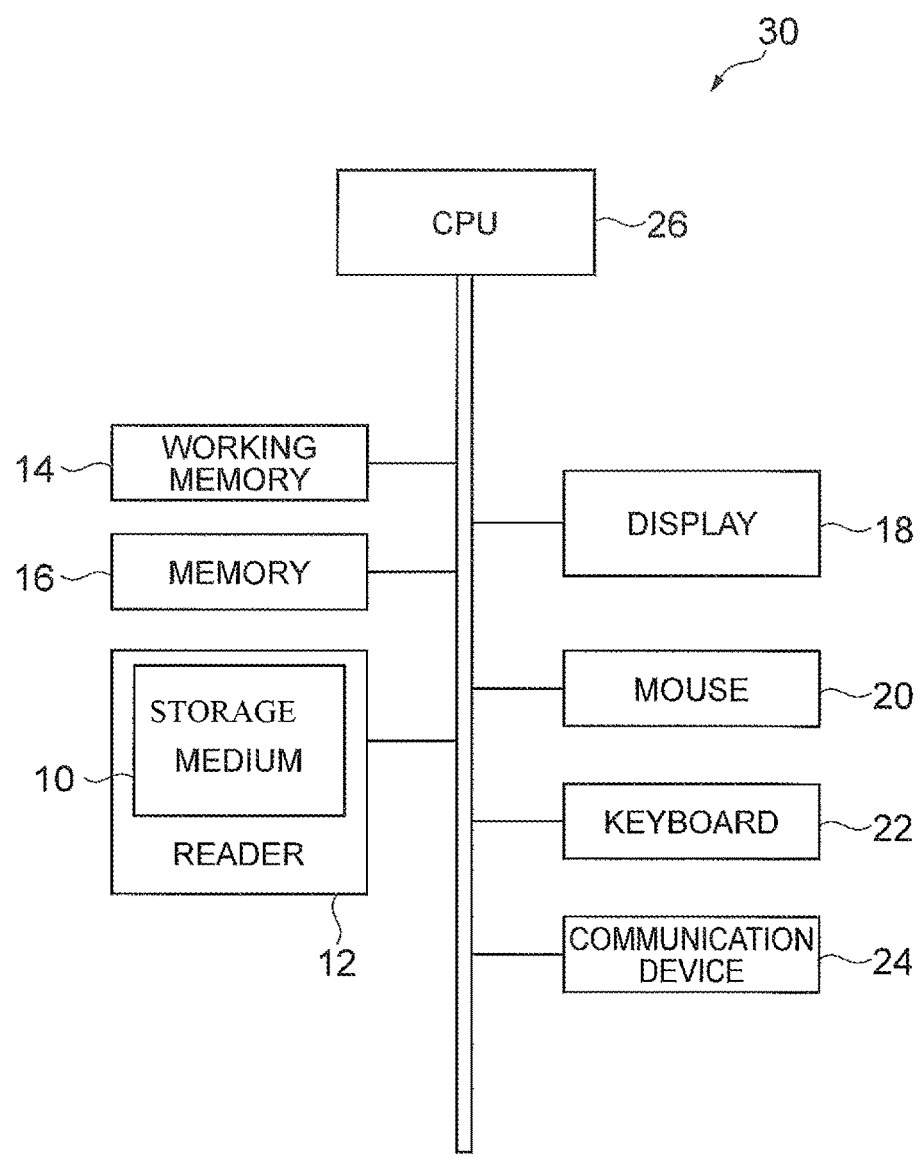
FIG. 6 is a drawing showing an example of a hardware configuration of a computer for executing a program stored in a storage medium.
Figure 7:
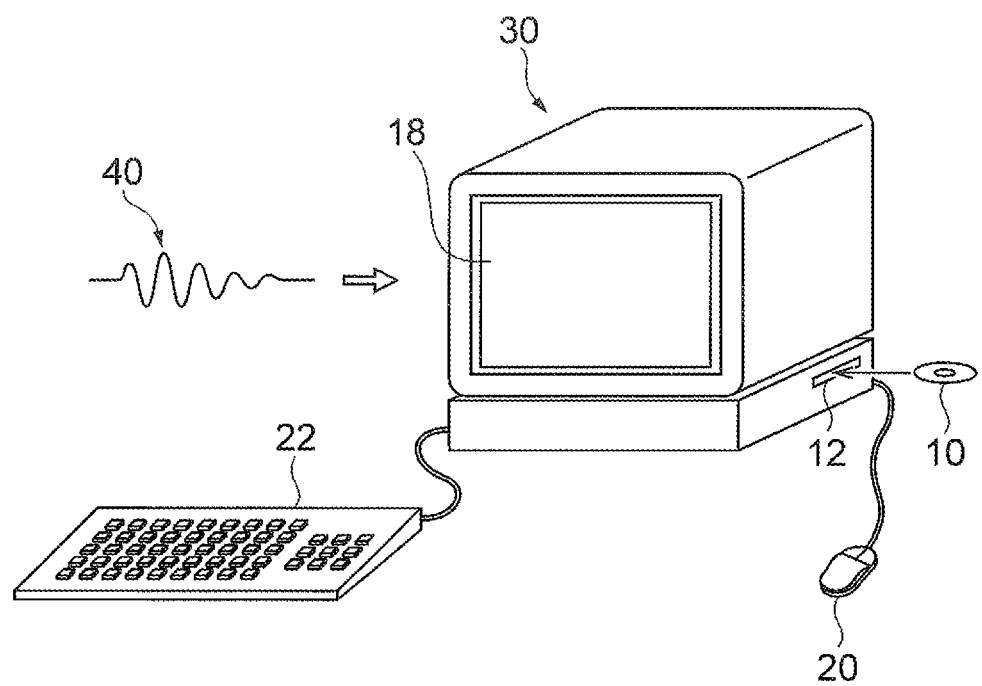
FIG. 7 is a perspective view of an example of a computer for executing a program stored in a storage medium.

FIG. 6 is a drawing showing an example of a hardware circuitry configuration of a computer that can be used for executing a program stored in a storage medium and FIG. 7 is an example of a general view of a computer for executing a program stored in a storage medium. The computer embraces a DVD player, a set-top box, a cell phone, etc. provided with a central processing unit (CPU) and configured to perform processing and control by software.

As shown in FIG. 6, the computer 30 is provided with circuitry that includes a reading device 12 such as a flexible disk drive unit, a CD-ROM drive unit, a communication port such as a universal serial bus port (USB), Bluetooth port, an infrared communication port, or any other type of communication port that allows communication with an external device, such as another computer or memory device. The computer 30 may also include or a DVD drive unit, a working memory 14 that may include an operating system is resident, a memory 16 that stores data, such as at least part of programs stored in the storage medium 10 In addition, the working memory 14 and/or the memory 16 may include the memory 14 and the memory 13. The working memory 14 and memory 16 may be one or more computer readable storage medium that is other than a transitory signal, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have user interface circuitry that includes, a monitor unit 18 like a display, a mouse 20 and a keyboard 22 as input devices, a touch screen display, a microphone for receipt of voice commands, a sensor, or any other mechanism or device that allows a user to interface with the computer 30. In addition, the circuitry of the computer 30 may include a communication device 24 for transmission and reception of data or the like, and a CPU 26 for controlling execution of programs. The processor 26 may be one or more one or more general processors, digital signal processors, application specific integrated circuits, field programmable gate arrays, digital circuits, analog circuits, combinations thereof, and/or other now known or later developed circuitry and devices for analyzing and processing data. In an example, when the storage medium 10 is put into the reading device 12, the computer 30 becomes accessible to the video predictive encoding program stored in the storage medium 10, through the reading device 12 and becomes able to operate as a special purpose machine in the form of the video predictive encoding device, which can include execution of the video predictive encoding program. Similarly, when the storage medium 10 is put into the reading device 12, the computer 30 becomes accessible to the video predictive decoding program stored in the storage medium 10, through the reading device 12 and becomes able to operate as a special purpose machine in the form of the video predictive decoding device, which can include execution of the video predictive decoding program.

As shown in FIG. 7, the video predictive encoding program or the video predictive decoding program may be one provided in the form of computer data signal 40 superimposed on a carrier wave, through a network. In this case, the computer 30 can execute the video predictive encoding program or the video predictive decoding program after the video predictive encoding program or the video predictive decoding program received by the communication device 24 is stored into the memory 16.

LIST OF REFERENCE SIGNS

10: storage medium; 30: computer; 100: video predictive encoding device; 101: input terminal; 102: block divider; 103: predicted signal generator; 104: frame memory; 105: subtracter; 106: transformer; 107: quantizer; 108: de-quantizer; 109: inverse-transformer; 110: adder; 111: entropy encoder; 112: output terminal; 113: input terminal; 114: frame memory manager; 200: video predictive decoding device; 201: input terminal; 202: data analyzer; 203: de-quantizer; 204: inverse-transformer; 205: adder; 206: output terminal; 207: frame memory; 208: predicted signal generator; 209: frame memory manager; 210: controller; P100: video predictive encoding program; P101: input component; P102: encoding component; P103: reconstruction component; P104: picture storage component; P105: control component; P200: video predictive decoding program; P201: input component; P202: reconstruction component; P203: picture storage component; P204: control component.

The invention claimed is:

1. A video predictive decoding device comprising:
    an input that is operable to receive a bitstream including a compressed form of a plurality of pictures constituting a video sequence, wherein each picture is defined with a network abstraction layer unit type that identifies said picture with one of a plurality of picture types including a clean random access (CRA) picture, a random access skipped (RAS) leading picture, and a non-RAS leading picture;
    a reconstruction that is operable to decode the compressed form of the plurality of pictures to reconstruct the plurality of pictures based on their picture types; and
    an output that is operable to output the reconstructed pictures;
    wherein the bitstream includes one or more of the following pictures:
    1) a CRA picture that is a first picture in the bitstream or appears later in the bitstream in a decoding order and operable to begin a new decoding process for decoding the bitstream when it is the first picture in the bitstream;
    2) a RAS leading picture that is an undecodable picture and precedes in an output order a CRA picture which is associated with the RAS leading picture and is the first picture in the bitstream in the decoding order; and
    3) a non-RAS leading picture that is a decodable picture and precedes in the output order a CRA picture which is associated with the non-RAS leading picture, and wherein a reference picture set (RPS) used for inter-prediction of a non-RAS leading picture does not include any of a RAS leading picture or a picture that precedes, in the decoding order, a CRA picture associated with the non-RAS leading picture, and the bitstream includes one CRA picture amid the bitstream, and a RPS used for inter-prediction of a picture associated with said one CRA picture includes no picture that precedes in the decoding order a prior CRA picture included amid the bitstream that precedes said one CRA picture in the decoding order, and the RPS used for inter-prediction of a picture associated with said one CRA picture includes in some cases at least one picture that resides in the decoding order between said one CRA picture and the prior CRA picture.

2. A video predictive decoding method executed by a video predictive decoding device; comprising:

an input step of receiving a bitstream including a compressed form of a plurality of pictures constituting a video sequence, wherein each picture is defined with a network abstraction layer unit type that identifies said picture with one of a plurality of picture types including a clean random access (CRA) picture, a random access skipped (RAS) leading picture, and a non-RAS leading picture;

a reconstruction step of decoding the compressed form of the plurality of pictures to reconstruct the plurality of pictures based on their picture types; and an output step of outputting the reconstructed pictures;

wherein the bitstream includes one or more of the following pictures:

1) a CRA picture that is a first picture in the bitstream or appears later in the bitstream in a decoding order and operable to begin a new decoding process for decoding the bitstream when it is the first picture in the bitstream;

2) a RAS leading picture that is an undecodable picture and precedes in an output order a CRA picture which is associated with the RAS leading picture and is the first picture in the bitstream in the decoding order; and 3) a non-RAS leading picture that is a decodable picture and precedes in the output order a CRA picture which is associated with the non-RAS leading picture, and wherein a reference picture set (RPS) used for inter-prediction of a non-RAS leading picture does not include any of a RAS leading picture or a picture that precedes, in the decoding order, a CRA picture associated with the non-RAS leading picture, and the bitstream includes one CRA picture amid the bitstream, and a RPS used for inter-prediction of a picture associated with said one CRA includes no picture that precedes in the decoding order a prior CRA picture included amid the bitstream that precedes said one CRA picture in the decoding order, and the RPS used for inter-prediction of a picture associated with said one CRA picture includes in some cases at least one picture that resides in the decoding order between said one CRA picture and the prior CRA picture.

3. A non-transitory computer readable storage medium comprising instructions executed by a computer to implement video predictive decoding, the computer readable storage medium comprising:

instructions executable with the computer to receive a bitstream including a compressed form of a plurality of pictures constituting a video sequence, wherein each picture is defined with a network abstraction layer unit type that identifies said picture with one of a plurality of picture types including a clean random access (CRA) picture, a random access skipped (RAS) leading picture, and a non-RAS leading picture;

instructions executable with the computer to decode the compressed form of the plurality of pictures to reconstruct the plurality of pictures based on their picture types; and instructions executable with the computer to output the reconstructed pictures;

wherein the bitstream includes one or more of the following pictures:

1) a CRA picture that is a first picture in the bitstream or appears later in the bitstream in a decoding order and operable to begin a new decoding process for decoding the bitstream when it is the first picture in the bitstream;

2) a RAS leading picture that is an undecodable picture and precedes, in an output order, a CRA picture which is associated with the RAS leading picture and is the first picture in the bitstream in the decoding order; and 3) a non-RAS leading picture that is a decodable picture and precedes, in the output order, a CRA picture which is associated with the non-RAS leading picture, and wherein a reference picture set (RPS) used for inter prediction of a non-RAS leading picture does not include any of a RAS leading picture or a picture that precedes, in the decoding order, a CRA picture associated with the non-RAS leading picture, and the bitstream includes one CRA picture amid the bitstream, and a RPS used for inter-prediction of a picture associated with said one CRA includes no picture that precedes in the decoding order a prior CRA picture included amid the bitstream that precedes said one CRA picture in the decoding order, and the RPS used for inter-prediction of a picture associated with said one CRA picture includes in some cases at least one picture that resides in the decoding order between said one CRA picture and the prior CRA picture.

* * * * *